Patented Sept. 18, 1934

1,973,999

UNITED STATES PATENT OFFICE 1,973,999

PROCESS FOR REMOVING ORGANIC COMPOUNDS FROM WATER SOLUTION

Oliver M. Urbain, Columbus, Ohio, assignor to Charles H. Lewis, Harpster, Ohio

No Drawing. Application March 15, 1932, Serial No. 599,067

5 Claims. (Cl. 210—2)

This invention relates to a process for removing organic compounds held in true solution from water. While processes have heretofore been developed for removing both suspended and colloidal matter from water, much difficulty has been experienced in eliminating the organic compounds held in true solution in the water. These organic compounds are oxygen consuming and when present in substantial quantities cause the water to have a substantial biochemical oxygen demand. Their removal is thus essential in order to eliminate the biochemical oxygen demand of water carrying such compounds. There are, of course, other reasons for eliminating organic compounds held in true solution from water.

I have heretofore proposed a process for removing organic compounds held in true solution from water by adsorbing such compounds by a suitable adsorbent introduced to the water. Experience has shown that the adsorption method, while of great value, involves the use of large quantities of adsorbent materials to remove comparatively small amounts of the organic compounds.

It is the purpose of the present invention to provide a process by which the organic compounds held in true solution in the water are converted by chemical reaction into insoluble compounds which precipitate.

Specfically, the invention contemplates removing organic compounds held in true solution from water by stoichiometric reaction with tribasic lead acetate.

The many organic compounds held in true solution seemed for the most part to be inert and it was only after exhaustive experimentation that it was discovered that they would chemically combine with tribasic lead acetate to form insoluble precipitates.

The tribasic lead acetate for use in my process can be made in two ways; first, by the action of acetic acid on lead oxide, as,

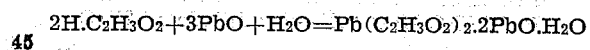

In this case 120 parts of acetic acid reacts with 669 parts of lead oxide to make 808 parts of tribasic lead acetate. The second method of production is as follows:

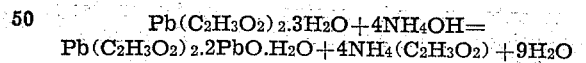

In making the reagent by the last reaction 1138 parts of lead acetate are reacted with 140 parts of ammonium hydroxide to form 808 parts of tribasic lead acetate. To prepare the reagent by the latter method which is the preferred procedure, because of economy, and facility of operation, one kilogram of lead acetate is dissolved in 14 liters of water and 250 ml. of ammonium hydroxide (28 to 29% $NH_3$) is added. The solution then contains 710 grams of tribasic lead acetate. If the reagent is prepared in warm or hot water, the volume of water used can be reduced in proportion to the solubility of the tribasic lead acetate in the water at the temperature employed. For instance if the procedure is carried out using hot water, only 4.3 liters of water need be used.

In the practice of the process it is only necessary to determine the total amount of each organic compound which it is desired to remove, calculate the amount of tribasic lead acetate required to react with such amounts of these substances, withdraw sufficient water from the bulk of the waste water to be treated to dissolve the calculated quantity of tribasic lead acetate required at the temperature employed, add the required amounts of lead acetate and ammonium hydroxide to produce the required amount of tribasic lead acetate and stir to complete the reaction, and then add the tribasic lead acetate so formed to the parent body of waste water and stir again to effect the distribution of the tribasic lead acetate in the body of water. The reaction between the tribasic lead acetate and the organic compounds is almost instantaneous and the insoluble precipitate settles rapidly in most cases.

If the precipitate shows peptization by the lead acetate (lead acetate is one product of the reaction between the tribasic lead acetate and the organic compounds being removed) it is only necessary to add a solution of sodium sulfate containing gram molecular equivalent amounts of sodium sulfate to lead acetate in the solution. The lead acetate will then be eliminated. Lead sulfate is formed which, being insoluble, is precipitated. The peptization is thus arrested. The exact amount of lead acetate in solution can be calculated and then the gram molecular equivalent of sodium sulfate calculated from that figure.

The procedure of destroying the by-product lead acetate should always be followed when the presence of lead acetate is objectionable in the effluent because lead acetate is always a product of the reaction between the tribasic lead acetate and the organic compound which it is sought to remove.

An example of the above procedure follows.

Assuming that there are 5000 gallons of a waste water to treat which analysis has shown contains 0.10% of salicylic acid by weight, and that the water is cold and slightly alkaline. There is contained in this waste 41.7 pounds of salicylic acid which converted into metric weights is equivalent to 19,005 grams. Tribasic lead acetate reacts with salicylic acid as follows, Pb(C₂H₃O₂)₂.2PbO.H₂O+2HO.C₆H₄.COOH=
2PbO.HO.C₆H₄.COOH+Pb(C₂H₃O₂)₂+2H₂O As shown by the reaction 808 parts of tribasic lead acetate reacts with 276 parts of salicylic acid to form 722 parts of plumbyl salicylate and 325 parts of lead acetate. Therefore $$\frac{808}{276} \times 41.7 = 122.1$$

pounds of tribasic lead acetate would be required to react with 41.7 pounds of salicylic acid. As tribasic lead acetate is soluble in cold water 5.55 parts in 100 parts of cold water (122.1÷5.55)×100=2200 pounds of cold water or 264 gallons, are required to dissolve 122.1 pounds of tribasic lead acetate. Therefore it is necessary to withdraw 264 gallons of the waste water in which to prepare the tribasic lead acetate.

In the preferred process of forming tribasic lead acetate, 1138 parts of lead acetate reacts with 140 parts of ammonium hydroxide to form 808 parts of tribasic lead acetate. Now if it is desired to make 122.1 pounds of tribasic lead acetate with 264 gallons of waste water in which to prepare it, it is easy to determine how much lead acetate and how much ammonium hydroxide to employ. As 1138 parts of lead acetate is required to make 808 parts of tribasic lead acetate, it is only necessary to divide 808 into 1138 and multiply by 122.1, $$\frac{1138}{808} \times 122.1 = 170.8$$

pounds of lead acetate are required. Likewise, $$\frac{140}{1138} \times 170.8 = 21.0$$

pounds of ammonium hydroxide will be required to react with 170.8 pounds of lead acetate. Therefore, to the 264 gallons of water there should be added 170.8 pounds of lead acetate and 21.0 pounds of ammonium hydroxide and the water then stirred. There is thus formed in this solution 122.1 pounds of tribasic lead acetate which is sufficient to react with 41.7 pounds of salicylic acid. This solution is now added to the parent solution and agitated so that the complete reaction takes place. The plumbyl salicylate is precipitated.

As shown previously, there is formed in this reaction 325 parts of lead acetate for each 808 parts of tribasic lead acetate reacting with salicylic acid. Therefore, there is in the solution above $$\frac{325}{808} \times 122.1 = 49.1$$

pounds of lead acetate. If peptization, due to the presence of this lead acetate, occurs or if the presence of the lead acetate is objectionable in the effluent, it can be destroyed by the addition of gram molecular equivalents of sodium sulfate. The reaction is as follows:—

Pb(C₂H₃O₂)₂+Na₂SO₄=PbSO₄+2NaC₂H₃O₂.

Lead sulfate, which is insoluble, is precipitated and sodium acetate, which does not peptize the precipitate formed by the tribasic lead acetate and the organic compounds, remains in solution. As shown by the reaction, 325 parts of lead acetate reacts with 142 parts of sodium sulfate. Therefore to react with 49.1 pounds of lead acetate there would be required $$\frac{142}{325} \times 49.1 = 21.4$$

pounds of sodium sulfate. The sodium sulfate is added to the parent body of the waste, preferably dissolved in water, and the whole agitated whereupon the lead in the lead acetate is converted to insoluble lead sulfate.

The tribasic lead acetate is loosely bound and is extremely sensitive to certain groups of organic compounds, even in the cold. Its reaction with these organic compounds takes place at all pH's in the alkaline range but not in the acid range in the lower part of the pH scale, i. e., below 2 or 3 pH. The presence of ammonium hydroxide or ammonium salts is desirable but not essential.

In the practice of the process the treating of batches of water is best adapted although a continuous flow procedure may be employed. As the reaction between the organic compounds and the tribasic lead acetate is stoichiometric, (i. e. combines in full numerical units) it is understood that the reagent shall be employed in gram molecular equivalents.

Among the organic compounds which are variously found in industrial wastes and the like, which are held therein in true solution, may be enumerated the following groups:—

Group 1 includes all carbohydrates conforming to the general formulæ $C_x(H_2O)_y$ and $C_x(H_2O)_{x-1}$. Grouped in this group are the monosaccharides, trisaccharides and tetrasaccharides, the reaction for which is as follows:—

Pb(C₂H₃O₂)₂.2PbO.H₂O+2C$_x$(H₂O)$_y$=
2PbO.C$_x$(H₂O)$_y$+Pb(C₂H₃O₂)₂+2H₂O

This group also includes all the polysaccharides, the reaction for which is as follows:—

Pb(C₂H₃O₂)₂.2PbO.H₂O+2C$_x$(H₂O)$_{x-1}$=
2PbO.C$_x$(H₂O)$_{x-1}$+Pb(C₂H₃O₂)₂+2H₂O

This group includes such compounds as dextrose, levulose, lactose, galactose, sucrose, starches, gums, dextrines, and the various celluloses. These substances, that is one or more of them, are found in the waste from straw-board, pulp, cannery, creamery, sugar, tannery, whey and many of the fermentation industries. They are found in more or less quantity in all organic wastes.

Group 2 includes all organic acids having one or more acidic carboxyl groups,—COOH. With these acids the reagent forms insoluble compounds. The reaction using salicylic acid, for example, is as follows:—

Pb(C₂H₃O₂)₂.2PbO.H₂O+2HO.C₆H₄.COOH=
2PbO.HO.C₆H₄.COOH+Pb(C₂H₃O₂)₂+2H₂O

This group includes such acids as benzoic, salicylic, tartaric, malic, succinic, etc. The acids of this group occur in many manufacturing processes. They are present in the wastes from fermentation and packing industries in large quantities. They are also found in all the organic wastes.

Group 3 includes any organic compound which is made up of one or more hydroxyl groups attached to an aromatic or closed carbon ring compound. An example of the reaction using hydroxybenzene is as follows:—

$$Pb(C_2H_3O_2)_2.2PbO.H_2O + 2C_6H_5OH = 2PbO.C_6H_5OH + Pb(C_2H_3O_2)_2 + 2H_2O$$

The reaction also takes place with the nitrated products of the above group. For instance the reaction with picric acid, which is a nitrated phenol, is as follows:—

$$Pb(C_2H_3O_2)_2.2PbO.H_2O + 2HO.C_2H_2.(NO_2)_3 = 2PbO.HO.C_2H_2.(NO_2)_3 + Pb(C_2H_3O_2)_2 + 2H_2O$$

This group includes all the phenols and their substituted products. This is a very large and important group and some of its members are found in many factory wastes, such for instance, as those from the manufacture of coke, gas, paints, lacquers and explosives. Many of the members of this group are formed during the putrefaction of organic matter, both animal and vegetable, consequently are found in varying quantities in all organic wastes.

Group 4 includes all amines and all organic compounds having the —$NH_2$ grouping, as well as all organic substances which on hydrolysis yield one or more acids which contain the —$NH_2$ grouping. The reaction with a simple amine, diethyl amine, for example, is shown as follows:—

$$Pb(C_2H_3O_2)_2.2PbO.H_2O + 2(C_2H_5)_2.NH = 2PbO.(C_2H_5)_2.NH + Pb(C_2H_3O_2)_2 + 2H_2O$$

The reaction with an amino acid, $NH_2.R.COOH$, in which R is an aliphatic radical, is as follows:—

$$Pb(C_2H_3O_2)_2.2PbO.H_2O + 2NH_2.R.COOH = 2PbO.NH_2.R.COOH + Pb(C_2H_3O_2)_2 + 2H_2O$$

This group includes all the amines, amino acids and all the proteins, both animal and vegetable, for all the proteins yield amino acids on hydrolysis. Some of the members of the above group are present in all organic wastes and especially those from the food industries, such for instance as canning and packing house wastes. The putrescible matter in packing house wastes consist almost entirely of members of this group.

The process for removing the organic compounds held in true solution in water may be carried out alone or it may be employed as a step in a complete water purification process. The reaction between the organic compounds held in true solution and the tribasic lead acetate is unaffected by the presence of other organic substances held in suspension or colloidal dispersion in the water.

Having thus described my invention what I claim is:—

1. A process for removing from water all organic compounds held in true solution therein which will react with tribasic lead acetate comprising determining the concentration of the organic compounds in the water and adding thereto sufficient tribasic lead acetate to stoichiometrically react therewith and form an insoluble compound.

2. A process for removing from water all carbohydrates conforming to the general formulæ $C_x(H_2O)_y$ and $C_x(H_2O)_{x-1}$ held in the water in true solution comprising introducing to the solution sufficient tribasic lead acetate to react with carbohydrates and form insoluble compounds.

3. A process for removing from water all organic acids having one or more acidic carboxyl groups —COOH, and all organic compounds which are made up of one or more hydroxyl groups attached to an aromatic or closed carbon ring compound held in the water in true solution which will react with tribasic lead acetate comprising incorporating in the water a quantity of tribasic lead acetate sufficient to react with said organic acids and phenols to form insoluble compounds.

4. A process for removing from water, amines and organic compounds having the —$NH_2$ grouping, comprising incorporating in the water a sufficient quantity of tribasic lead acetate to react therewith and form insoluble compounds.

5. In a process of water purification the steps which comprise introducing to the water tribasic lead acetate to chemically combine with organic compounds held in true solution in the water to form insoluble compounds, and precluding peptization by addition to the water of suitable quantities of a solution of sodium sulfate.

OLIVER M. URBAIN.